United States Patent [19]

Millerd et al.

[11] Patent Number: 4,897,585

[45] Date of Patent: Jan. 30, 1990

[54] MOISTURE SENSOR FOR AN AUTOMATIC VEHICLE WINDOW WIPER CONTROL

[75] Inventors: Donald L. Millerd, San Diego; Marl J. Bell, Valley Center, both of Calif.

[73] Assignee: Mist-Defy'R, Inc., LaJolla, Calif.

[21] Appl. No.: 221,866

[22] Filed: Jul. 20, 1988

[51] Int. Cl.$^4$ .............................................. B60S 1/08
[52] U.S. Cl. ..................................... 318/483; 318/444; 318/DIG. 2; 15/250 C
[58] Field of Search ......... 318/443, 444, 483, DIG. 2; 15/250 C, 250.12, 250.13

[56] References Cited

U.S. PATENT DOCUMENTS

| | | | |
|---|---|---|---|
| 2,407,215 | 9/1946 | Anderson | 15/250.02 |
| 3,649,898 | 3/1972 | Inoue | 318/483 |
| 4,127,763 | 11/1978 | Roselli | 318/483 X |
| 4,317,073 | 2/1982 | Blaszkowski | 318/483 |
| 4,463,294 | 7/1984 | Gibson | 318/444 X |
| 4,665,351 | 5/1987 | Nyberg | 318/483 |
| 4,705,998 | 11/1987 | Millerd et al. | 318/483 |

Primary Examiner—Bentsu Ro
Attorney, Agent, or Firm—Milde & Robinson

[57] ABSTRACT

A moisture sensor for sensing ambient moisture in the vicinity of a window having a window wiper. The sensor comprises a plurality of spaced apart conductive strips having an exposed surface. The electrical resistance between adjacent strips is dependent on the ambient moisture. The sensor also includes means for repetitively removing the moisture from the exposed surface and in the region between the strips. The conductive strips are located at a position other than in the area of sweep of the window wiper on the window and at least one of the removing means and the plurality of conductive strips is coupled to the window wiper, whereby the at least one of the removing means and the plurality of conductive strips is actuated by the window wiper and operates in synchronism therewith.

10 Claims, 4 Drawing Sheets

MOISTURE SENSOR FOR AN AUTOMATIC VEHICLE WINDOW WIPER CONTROL

BACKGROUND OF THE INVENTION

This invention relates to an improvement in a moisture sensor for sensing ambient moisture in the vicinity of a window having a window wiper.

U.S. Pat. No. 4,705,998-Millerd et al relates to an automatic window wiper control and in FIG. 2 represents exposed conductive elements positioned for encountering a window wiper blade during its normal to-and-fro sweep. A typical printed circuit-type sensor is shown in FIG. 4 of the patent. The moisture sensor disclosed by the patent is subject to the limitation that the moisture sensor is positioned where it can be wiped by the windshield wiper and thus is positioned in the normal field of view of the driver swept by the windshield wiper.

SUMMARY OF THE INVENTION

It is an object of the present invention, therefore, to provide an improvement in a moisture sensor for sensing ambient moisture in the vicinity of a window having a window wiper which avoids one or more of the limitations of prior such moisture sensors.

It is another object of the invention to provide a new and improved moisture sensor for sensing ambient moisture in the vicinity of a window having a window wiper, which moisture sensor is not in the normal field of view of the driver swept by the windshield wiper.

In accordance with the invention, in a moisture sensor for sensing ambient moisture in the vicinity of a window having a window wiper, the sensor comprising, in combination (a) a plurality of spaced apart conductive strips having an exposed surface, the electrical resistance between adjacent strips being dependent on the ambient moisture; and (b) means for repetitively removing the moisture from the exposed surface and in the region between the strips; there is the improvement wherein the plurality of conductive strips is located at a position other than in the area of sweep of the window wiper on the window and at least one of the removing means and the plurality of conductive strips is coupled to the window wiper; whereby the at least one of the removing means and the plurality of conductive strips is actuated by the window wiper and operates in synchronism therewith.

For a better understanding of the present invention, together with other and further objects thereof, reference is made to the following description, taken in connection with the accompanying drawings, and its scope will be pointed out in the appended claims.

DESCRIPTION OF THE PREFERRED EMBODIMENTS

Figure 1:
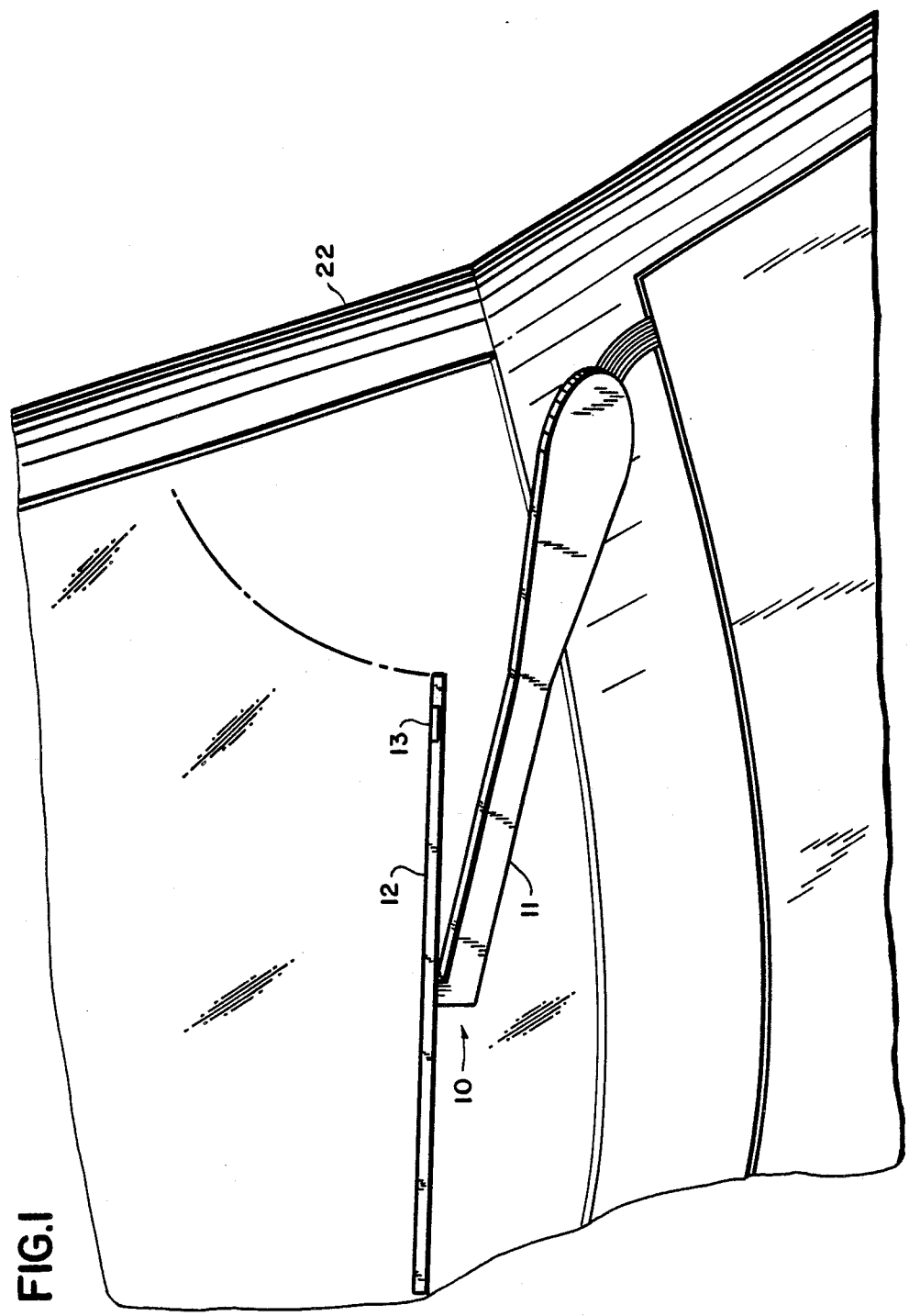
FIG. 1 is a plan view, partly diagrammatic, of a window wiper including a moisture sensor comprising the improvement in accordance with the invention and disposed on the windshield of an automobile.
Figure 2:
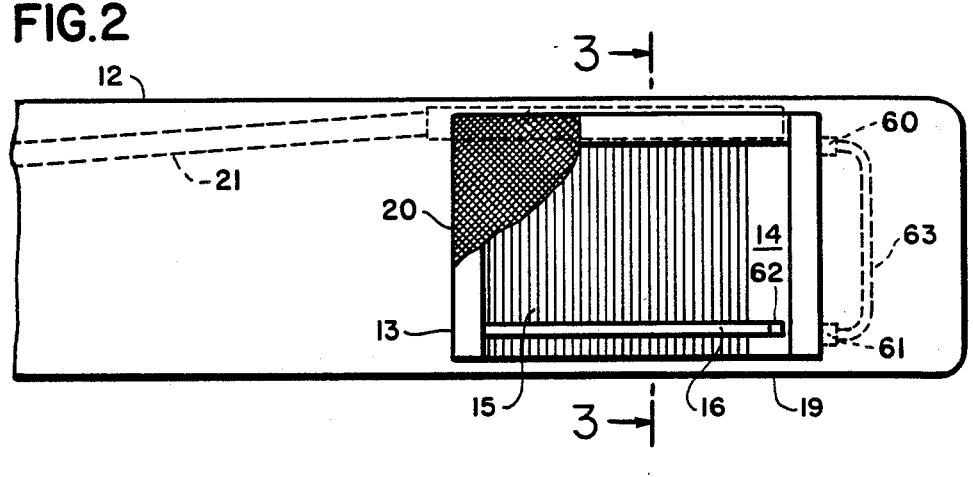
FIG. 2 is a fragmentary plan view, to an enlarged scale, of a portion of the FIG. 1 window wiper including the moisture sensor comprising the improvement in accordance with the invention.
Figure 3:
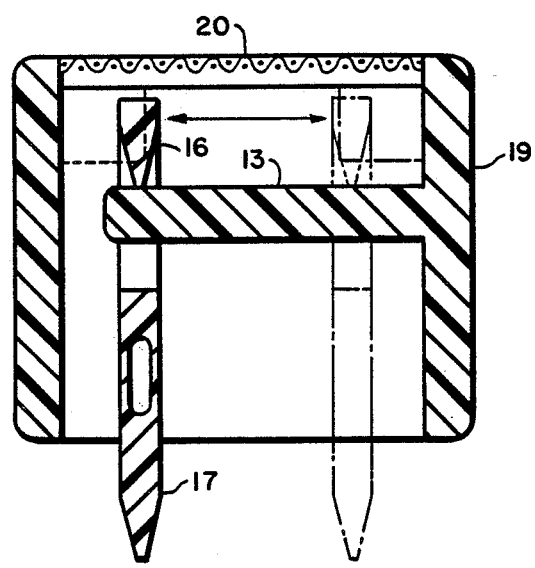
FIG. 3 is a sectional view, partly diagrammatic, taken along line 3—3 of FIG. 2 to an enlarged scale.
Figure 4:
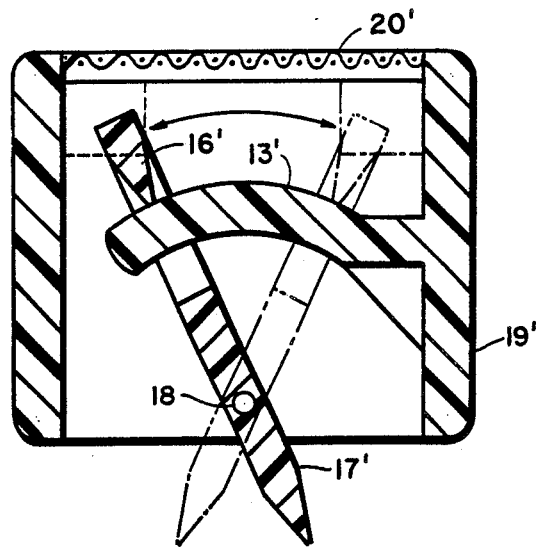
FIG. 4 is a sectional view, partly diagrammatic and to an enlarged scale, of a different embodiment of the moisture sensor of FIG. 2 corresponding to a similar view to that taken along line 3—3 of FIG. 2.

Referring now ti 1 1 to FIGS. 1 and 2 of the drawings, there is represented in plan view a windshield wiper 10 having a conventional movable armature 11 and a wiper housing 12, preferably of plastic. A moisture sensor for sensing ambient moisture in the vicinity of a window 22 having a window wiper preferably comprises, in combination, (a) an insulating substrate 13 which has an exposed surface 14 and which may be a portion of the window wiper surface, and (b) a plurality of spaced apart conductive strips 15 having an exposed surface disposed on the exposed surface 14. The electrical resistance between adjacent strips is dependent on the ambient moisture. The sensor also preferably comprises means for repetitively removing the moisture from the exposed surface 14 in the region of the strips 15. This means comprises a sensor wiper 16 also represented in FIGS. 3 and 4 to an enlarged scale. The insulating substrate 13 and the plurality of conductive strips 15 are located at a position other than in the area of sweep of the window wiper on a window and the moisture-removing means 16 is coupled to the window wiper 17 as represented in FIGS. 3 and 4. The moisture-removing means 16 preferably is actuated by the window wiper 17 and operates in synchronism therewith as may be seen from FIGS. 3 and 4.

Referring now to FIG. 3 of the drawings, the windshield wiper housing 19 has a surface 13 approximately parallel to the vehicle window and the exposed conductive strips 15 preferably are on the surface 13. The removing means 16 preferably is slidable along the sensor surface 13 and the strips 15. Thus, the insulating substrate 13 may, if desired, be the surface of the windshield wiper housing 19. The sensor wiper 16 is repetitively actuated by the windshield wiper 17 which slides in its housing 19 to the position represented in broken-line construction when sweeping an arc of the windshield. The insulating substrate 13 is disposed out of the area of sweep of the windshield wiper 17. A protective mesh 20 is disposed over the moisture sensor but moisture penetrates the mesh 20 so that it does not interfere with the operation of the moisture sensor.

As represented in broken-line construction in FIG. 2, the wires 21 connected to the conductive strips may be enclosed in the housing 19. Hall-effect transistors 61 preferably are disposed as position sensors at the end positions of the sweep of the sensor wiper 16. A permanent magnet 62 preferably is disposed at the end of the sensor wiper 16 which renders either of the transistors 60, 61 effective to develop an output signal when the magnet 62 is at each end of its sweep. Wires 63 connect the transistors 60, 61 to a suitable sensing circuit (not shown). The sensing circuit receives timing and the direction of sweep wiper 16 information from transistors, 60, 61.

In the FIG. 4 embodiment, the windshield wiper 17' is pivoted at a pin 18 mounted on the protective housing 19' and motion of the armature flips the wipers 16' and 17' from the position represented in solid-line construction to the position represented in broken-line construction. The insulating surface 13' is a movable member which is pivotable across an arc with respect to the window.

Figure 5:
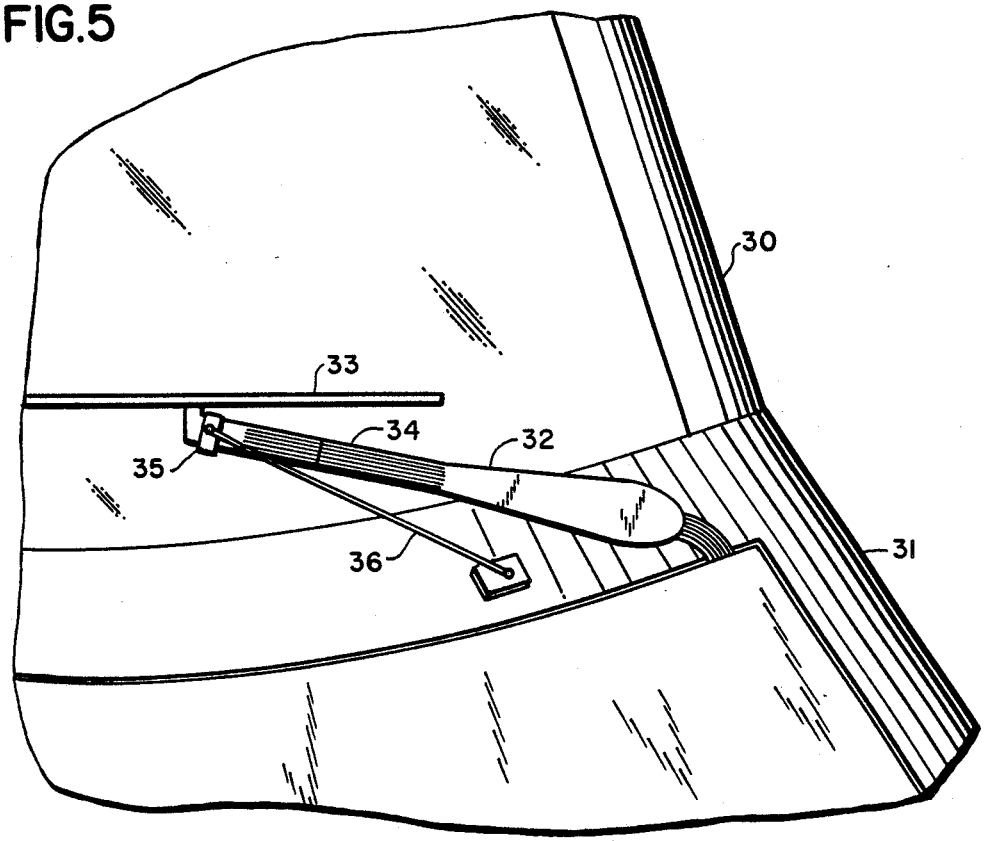
FIG. 5 is a perspective view, partly diagrammatic, of a portion of an automobile having a windshield wiper including a moisture sensor comprising the improvement in accordance with the invention.

Referring now more particularly to FIG. 5 of the drawings, there is represented diagrammatically a portion of a windshield 30 of an automobile having a hood region 31. An armature 32 havig a windshield wiper 33 for sweeping in an arc across the windshield is represented with a moisture sensor 34 having exposed conductive strips on the armature 32 which preferably is made of plastic. A wiper 35 of a sleeve type is supported on the armature 32 and is attached to the hood by a link 36. As the armature moves across the windshield, the sleeve 35 moves along the armature 32 and wipes the moisture from the conductive strips of the moisture sensor 34. The sensor-wiping means is actuated by the window wiper and operates in synchronism therewith.

Figure 6:
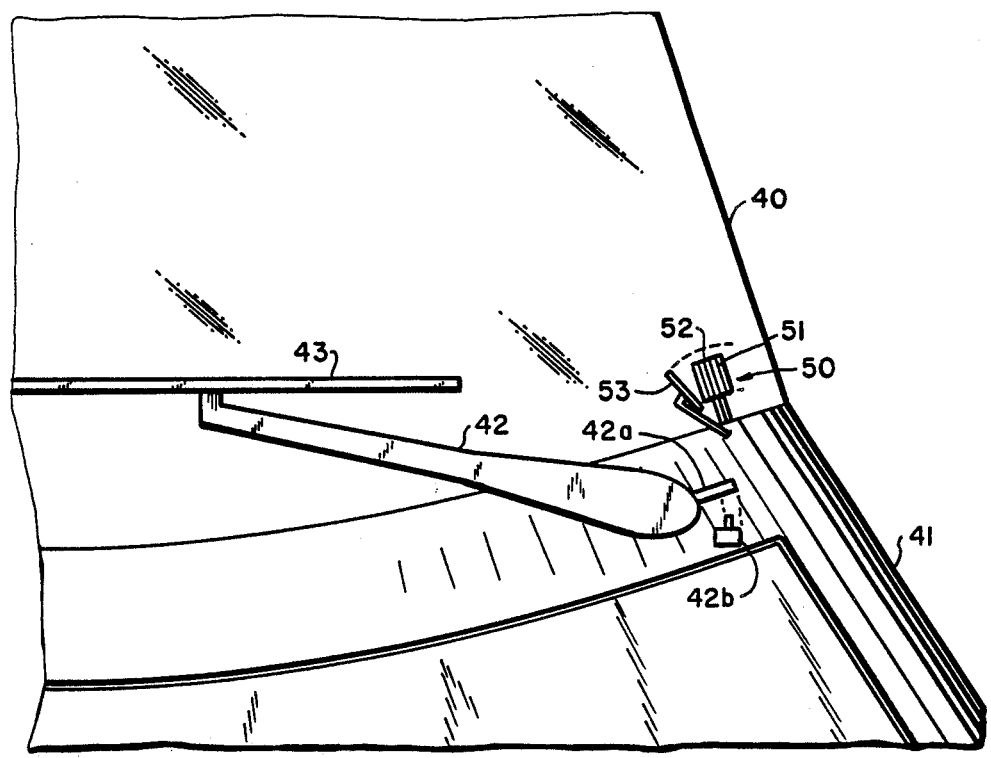
FIG. 6 is a perspective view, partly diagrammatic, of a portion of an automobile having a windshield wiper and also having a moisture sensor comprising the improvement in accordance with the invention.

Referring now more particularly to FIG. 6 of the drawings, there is represented diagrammatically a portion of a windhsield 40 of a motor vehicle having a hood portion 41. A conventional windshield wiper armature 42 is utilized with a conventional windshield wiper 43. An arm 42a is attached to the windshield wiper armature 42 for pivoting with the armature 42 to strike a limit switch 42b utilized as will be described subsequently. A moisture sensor in accordance with the invention is mounted at a position other than in the area of sweep of the windshield wiper 43 on the windshield. An insulating substrate 50 has an exposed surface 51 and a plurality of spaced apart conductive strips 52 disposed on the exposed surface 51. The electrical resistance between adjacent strips is dependent on the ambient moisture. The sensor also comprises means for repetitively removing the moisture from the exposed surface 51 in the region of the strips 52. This means comprises a sensor wiper 53, which may, for example, be a miniature windshield wiper for repetitively wiping the surface 51 and the strips 52. The sensor wiper 53 is electrically coupled to the window wiper 43 and operates in synchronism therewith. The windshield wiper 53 is located at a position other than in the area of sweep of the window wiper 43 on the window and does not interfere with the view of the driver because it is disposed out of the area of the sweep of the windshield wiper 43.

Figure 7:
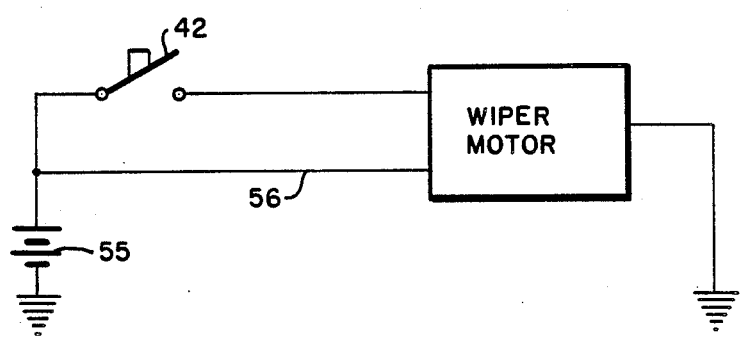
FIG. 7 is a schematic diagram of an electrical circuit useful with the FIG. 6 moisture sensor.

The electrical coupling between the windshield wiper 43 and the sensor wiper 53 is provided by means of the arm 42a on the windshield wiper armature 42 and a limit switch 42b which the arm 42a strikes at the end of each sweep of the windshield wiper 43. Referring to FIG. 7, the limit switch 42 repetitively closes a connection between a battery 55 and a wiper motor 54 of conventional construction for the wiper 53. This closed connection through limit switch 42 causes the wiper motor to be actuated for each successive sweep of the wiper 43. The connection 56 between the battery 55 and the wiper motor 54 is effective to keep the wiper motor 54 energized at the end of the actuation by the limit switch 42 until the wiper 53 reaches its home-park position under the control of an internal home-park switch of the wiper motor 54.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a moisture sensor for sensing ambient moisture in the vicinity of a vehicle window having a window wiper, said sensor comprising, in combination:
    (a) a plurality of spaced apart conductive strips having an exposed surface, the electrical resistance between adjacent strips being dependent on the ambient moisture; and
    (b) means for repetitively removing the moisture from said exposed surface and in the region between said strips;
    the improvement wherein said plurality of conductive strips is located at a position other than in the area of sweep of said window wiper on said window and at least one of said removing means and said plurality of conductive strips is coupled to said window wiper;
    whereby said at least one of said removing means and said plurality of conductive strips is actuated by said window wiper and operates in synchronism therewith.

2. The improvement in accordance with claim 1 which includes an insulating substrate which is a movable member on which said conductive strips are disposed.

3. The improvement in accordance with claim 2 in which said movable member is pivotable across an arc with respect to the window.

4. The improvement in accordance with claim 2 in which said movable member is a windshield wiper housing.

5. The improvement in accordance with claim 4 in which said windshield wiper housing has a surface approximately parallel to said vehicle window and in which said exposed conductive strips are on said surface.

6. The improvement in accordance with claim 4 in which said removing means comprises a sensor wiper repetitively actuated by said windshield wiper housing.

7. The improvement in accordance with claim 6 in which said sensor wiper is pivotable.

8. The improvement in accordance with claim 6 in which said sensor wiper is slidable.

9. The improvement in accordance with claim 6 further comprising a protective mesh disposed over said moisture sensor.

10. The improvement in accordance with claim 1 in which said removing means is actuated by said window wiper and operates in synchronism therewith.

* * * * *